(12) United States Patent
Gilson et al.

(10) Patent No.: US 11,619,567 B2
(45) Date of Patent: Apr. 4, 2023

(54) MULTI-MODE MICROWAVE WAVEGUIDE BLADE SENSING SYSTEM

(71) Applicant: Raytheon Technologies Corporation, Farmington, CT (US)

(72) Inventors: Jonathan Gilson, West Hartford, CT (US); Joseph V. Mantese, Ellington, CT (US); Gurkan Gok, Milford, CT (US); Goran Djuknic, New York, NY (US); Coy Bruce Wood, Ellington, CT (US); Joseph Zacchio, Wethersfield, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 81 days.

(21) Appl. No.: 17/063,044

(22) Filed: Oct. 5, 2020

(65) Prior Publication Data

US 2022/0107242 A1    Apr. 7, 2022

(51) Int. Cl.
*G01M 15/14* (2006.01)
*G01B 15/00* (2006.01)
(Continued)

(52) U.S. Cl.
CPC ............. *G01M 15/14* (2013.01); *G01B 15/00* (2013.01); *G01D 5/48* (2013.01); *G01P 3/00* (2013.01)

(58) Field of Classification Search
CPC ........... F01D 21/04; G01B 7/14; G01B 11/14; G01B 15/00; G01D 5/48; G01H 9/00;
(Continued)

(56) References Cited

U.S. PATENT DOCUMENTS 3,308,468 A    3/1967   Hannan
4,533,884 A    8/1985   Hudspeth et al.
(Continued)

FOREIGN PATENT DOCUMENTS

DE    19705769 A1    8/1998
EP    2457305 B1     8/2017
(Continued)

OTHER PUBLICATIONS

European Search Report issued in European Application No. 21201068.0; Application Filing Date Oct. 5, 2021; dated Feb. 21, 2022.
(Continued)

*Primary Examiner* — Lee E Rodak
*Assistant Examiner* — Martin Walter Braunlich
(74) *Attorney, Agent, or Firm* — Cantor Colburn LLP

(57) ABSTRACT

A multi-mode microwave waveguide blade sensing system includes a transceiver, a waveguide, and a probe sensor. The transceiver generates a microwave energy signal having a first waveguide mode and a different second waveguide mode. The waveguide includes a first end that receives the microwave energy signal. The probe sensor includes a proximate end that receives the microwave energy signal from the transceiver and a distal end including an aperture that outputs the microwave energy signal. The probe sensor directs the microwave energy signal at a first direction based on the first waveguide mode and a different second direction different based on the second waveguide mode. The probe sensor receives different levels of reflected microwave energy based at least in part on a location at which the at least one microwave energy signal is reflected from the machine.

11 Claims, 8 Drawing Sheets

(51) Int. Cl.
*G01D 5/48* (2006.01)
*G01P 3/00* (2006.01)

(58) Field of Classification Search
CPC .......... G01M 15/14; G01P 3/00; G01S 13/36; G01S 13/88; H04B 3/52; H01P 3/12
See application file for complete search history.

(56) References Cited

U.S. PATENT DOCUMENTS

| | | | |
|---|---|---|---|
| 5,212,943 | A | 5/1993 | Harris |
| 5,479,826 | A | 1/1996 | Twerdochlib et al. |
| 5,818,242 | A | 10/1998 | Grzybowski et al. |
| 6,037,908 | A * | 3/2000 | Phillips .................. H01Q 19/06 343/753 |
| 6,717,418 | B2 | 4/2004 | Orenstein |
| 7,231,180 | B2 | 6/2007 | Benson et al. |
| 7,276,703 | B2 | 10/2007 | Berkean et al. |
| 7,688,081 | B2 | 3/2010 | Webster |
| 7,722,310 | B2 | 5/2010 | Balasubramaniam et al. |
| 7,825,669 | B2 | 11/2010 | Parsons et al. |
| 7,890,293 | B2 | 2/2011 | Bosselmann et al. |
| 8,121,813 | B2 | 2/2012 | Ren et al. |
| 8,552,597 | B2 | 10/2013 | Song et al. |
| 8,558,538 | B2 | 10/2013 | Phillips et al. |
| 9,057,596 | B2 | 6/2015 | Xu et al. |
| 9,303,523 | B2 | 4/2016 | Rodriguez et al. |
| 9,677,868 | B2 | 6/2017 | Singh et al. |
| 9,986,310 | B2 | 5/2018 | Sobanski et al. |
| 10,247,031 | B2 | 4/2019 | Carter et al. |
| 10,280,787 | B2 | 5/2019 | Pratt et al. |
| 10,307,138 | B2 | 6/2019 | Heims et al. |
| 10,309,342 | B2 | 6/2019 | Mueller et al. |
| 10,316,686 | B2 | 6/2019 | Hudson et al. |
| 10,411,756 | B2 | 9/2019 | Snyder et al. |
| 2003/0094956 | A1 | 5/2003 | Orenstein |
| 2007/0114422 | A1 | 5/2007 | Berkcan et al. |
| 2010/0066387 | A1 | 3/2010 | Bosselmann et al. |
| 2011/0194122 | A1 * | 8/2011 | Heyworth ............... G01S 13/08 356/615 |
| 2012/0119020 | A1 | 5/2012 | Burns et al. |
| 2014/0083183 | A1 | 3/2014 | Edvardsson |
| 2016/0273973 | A1 | 9/2016 | Larsen et al. |
| 2017/0007254 | A1 | 1/2017 | Jaworek et al. |
| 2017/0335795 | A1 | 11/2017 | Klemen et al. |
| 2018/0219579 | A1 | 8/2018 | Britz et al. |
| 2018/0266969 | A1 | 9/2018 | Jean et al. |
| 2018/0289359 | A1 | 10/2018 | Heims et al. |
| 2018/0294838 | A1 | 10/2018 | Snyder et al. |
| 2019/0250058 | A1 | 8/2019 | Schofield |

FOREIGN PATENT DOCUMENTS

| | | | | |
|---|---|---|---|---|
| EP | 3291041 | A1 * | 3/2018 | ........... F01D 21/003 |
| EP | 3291570 | A1 | 3/2018 | |
| EP | 3296635 | A1 | 3/2018 | |
| EP | 2577023 | B1 | 5/2018 | |
| EP | 3826188 | A1 | 5/2021 | |
| EP | 3826192 | A1 | 5/2021 | |
| WO | 2011153496 | A1 | 12/2011 | |

OTHER PUBLICATIONS

European Partial Search Report for European Application No. 21201073.0; Application Filing Date: Oct. 5, 2021; Date of Action Feb. 24, 2022; 13 pages.

European Search Report for European Application No. 21201061.5; Application Filing Date: Oct. 5, 2021; Date of Action: Mar. 7, 2022; 8 pages.

European Search Report for European Application No. 21201074.8; Application Filing Date: Oct. 5, 2021; Date of Action: Feb. 28, 2022; 6 pages.

Partial European Search Report for European Application No. 21201062.3; Application Filing Date: Oct. 5, 2021; Date of Search: Mar. 10, 2022; 10 pages.

* cited by examiner

MULTI-MODE MICROWAVE WAVEGUIDE BLADE SENSING SYSTEM

BACKGROUND

This disclosure relates to electromagnetic communication, and more particularly to a radio frequency waveguide system for aircraft blade sensing.

Compressor and turbine sections of an aircraft include multiple rotors and stators. Gas turbine engines maintain an optimal clearance (distance) between the tips of the rotors and an outside diameter of a gas path within the turbine engine. Blade measurement systems are therefore used to obtain accurate measurements of blade parameters such as tip clearance and tip timing to maintain efficient engine operation and blade health monitoring.

As control and health monitoring systems become more complex, the interconnect count between system components increases, which also increases failure probabilities. With the increase in interconnects, large amounts of cabling may be used to connect sensors and actuators to controllers and/or diagnostic units of a machine. Long cable runs, including multiple wires, can add substantial weight and may increase susceptibility to noise effects and/or other forms of signal degradation. Increased wire connections can also result in a larger number of wire harnesses to remove and attach when servicing machine components. A larger number of wires and wire harnesses can increase the possibility of damage at pin/socket interconnects, particularly when the wire harnesses are attached and detached from components.

To achieve desired control, health monitoring and/or component measurement, sensing systems such as a blade measurement system, for example, may need information from locations that can be difficult to access due to moving parts, internal operating environment or machine configuration. The access limitations can make wire routing bulky, expensive, and potentially vulnerable to interconnect failures. Sensor and interconnect operating environments for desired sensor locations may exceed the capability of interconnect systems. In some cases, cable cost, volume, and weight may exceed desired limits for practical applications. Placement options and total number of sensors and actuators that may be installed in a machine can be limited by wiring and connector impacts on weight, reliability, physical sizing, and operating temperature limitations.

BRIEF DESCRIPTION

According to a non-limiting embodiment, a multi-mode microwave waveguide blade sensing system includes a transceiver a waveguide and a probe sensor. The transceiver is configured to generate at least one microwave energy signal having a first waveguide mode and a second waveguide mode different from the first waveguide mode. The waveguide includes a first end is configured to receive the at least one microwave energy signal from the transceiver. The probe sensor includes a proximate end in signal communication with a second end of the waveguide to receive the at least one microwave energy signal and a distal end including an aperture configured to output the at least one microwave energy signal. The probe sensor directs the microwave energy signal toward a machine at a first direction based on the first waveguide mode and a second direction different from the first direction based on the second waveguide mode, and receives different levels of reflected microwave energy based at least in part on a location at which the at least one microwave energy signal is reflected from the machine.

According to another non-limiting embodiment, a probe sensor comprises a probe body extending from a proximate end to a distal end to define at least one probe channel. The proximate end is configured to establish signal communication with a waveguide and the distal end includes at least one aperture configured to output at least one microwave energy signal. At least one lens is disposed in the at least one aperture. The probe body is configured to simultaneously deliver a first type of microwave energy signal and a second type of microwave energy signal between the proximate end and the distal end A technical effect of the apparatus, systems and methods is achieved by a multi-mode microwave waveguide blade sensing system as described herein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Turning first to an overview of technical details that are relevant to the disclosure, waveguides are devices capable of directing microwave energy signal (e.g., wave) from a signal source to one or more target destinations. The microwave energy signal can be propagated according to different waveguide modes. A waveguide mode is a particular electromagnetic field pattern of waves in a plane perpendicular to the radiation's propagation direction, e.g., the cross section of the waveguide. This pattern can take infinitely many different shapes in a waveguide. In addition, different waveguide modes can be selectively excited, and different waveguide modes can co-exist in the waveguide. Because the pattern of fields are different on the waveguide cross section, each mode has a different field pattern when they are output from the aperture of the waveguide.

Various non-limiting embodiments of the disclosure provide a multi-mode microwave waveguide blade sensing system configured to generate a blade signature of a given blade in a gas engine turbine. The multi-mode microwave waveguide blade sensing system utilizes a waveguide capable delivering at least one microwave energy signal having a first waveguide mode and a second waveguide mode different from the first waveguide mode. The different waveguide modes allow for targeting specific locations of the blade, which in turn maximize the level of energy reflected from the blade, thereby resulting in an improved resolution and accuracy of a blade signature of the blade.

Figure 1:
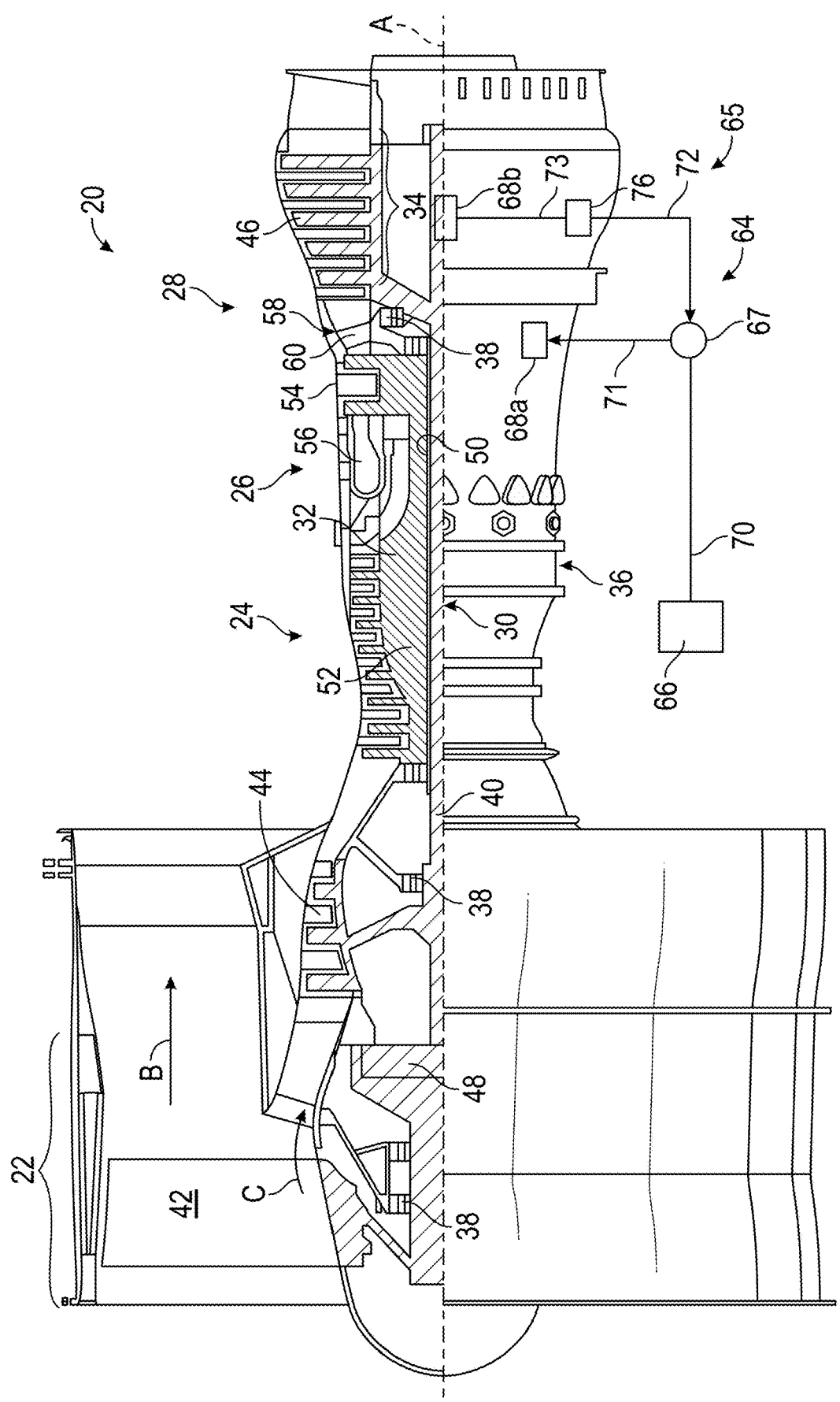
FIG. 1 is a cross-sectional view of a gas turbine engine as an example of a machine according to a non-limiting embodiment of the disclosure.

Various embodiments of the present disclosure are related to electromagnetic communication through and to components of a machine. FIG. 1 schematically illustrates a gas turbine engine 20 as one example of a machine as further described herein. The gas turbine engine 20 is depicted as a two-spool turbofan that generally incorporates a fan section 22, a compressor section 24, a combustor section 26 and a turbine section 28. Alternative engines may include an augmentor section (not shown) among other systems or features.

The fan section 22 drives air along a bypass flow path B in a bypass duct to provide a majority of the thrust, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein including for example the non-limiting embodiments of the multi-mode microwave waveguide blade sensing system and the probe sensor described herein, are not limited to use with two-spool turbofans as the teachings may be applied to other types of turbine engines including three-spool architectures or any other machine that requires sensors to operate with similar environmental challenges or constraints. Additionally, the concepts described herein may be applied to any machine or system comprised of control and/or health monitoring systems. Examples can include various moderate to high temperature environments, such as glass and metal forming systems, petroleum-oil-and-gas (POG) systems, ground-based turbine for energy generation, nuclear power systems, and transportation systems.

With continued reference to FIG. 1, the exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine engine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48. In direct drive configurations, the gear system 48 can be omitted.

The engine 20 in one example is a high-bypass geared aircraft engine. Low pressure turbine 46 pressure ratio is pressure measured prior to inlet of low pressure turbine 46 as related to the pressure at the outlet of the low pressure turbine 46 prior to an exhaust nozzle. A significant amount of thrust can be provided by the bypass flow B due to the high bypass ratio. The example low pressure turbine 46 can provide the driving power to rotate the fan section 22 and therefore the relationship between the number of turbine rotors 34 in the low pressure turbine 46 and the number of blades in the fan section 22 can establish increased power transfer efficiency.

The disclosed example gas turbine engine 20 includes a control and health monitoring system 64 (generally referred to as system 64) utilized to monitor component performance and function. The system 64 includes a network 65, which is an example of a waveguide electromagnetic transmission network. The network 65 includes a controller 66 operable to communicate with nodes 68a, 68b through electromagnetic signals. The controller 66 can be in signal communication with a microwave transceiver to generate and transmit the electromagnetic signals. The nodes 68a, 68b can be distributed throughout the gas turbine engine 20 or other such machine. Node 68a is an example of an actuator node that can drive one or more actuators/effectors of the gas turbine engine 20. Node 68b is an example of a sensor node that can interface with one or more sensors of the gas turbine engine 20. Nodes 68a, 68b can include processing support circuitry to transmit/receive electromagnetic signals between sensors or actuators and the controller 66. A coupler 67 can be configured as a splitter between a waveguide 70 coupled to the controller 66 and waveguides 71 and 72 configured to establish wireless communication with nodes 68a and 68b respectively. The coupler 67 can be a simple splitter or may include a repeater function to condition electromagnetic signals sent between the controller 66 and nodes 68a, 68b.

In the example of FIG. 1, a radio frequency-based repeater 76 is interposed between the coupler 67 and node 68b, where waveguide 72 is a first waveguide coupled to the coupler 67 and radio frequency-based repeater 76, and waveguide 73 is a second waveguide coupled to the radio frequency-based repeater 76 and node 68b. Collectively, waveguides 70, 71, 72, 73 are configured to direct transmission of the radio frequencies (e.g., electromagnetic signals) between the controller 66 and one or more of the nodes 68a, 68b. The transmission media within waveguides 70-73 may include dielectric or gaseous material. In embodiments, the waveguides 70-73 can be hollow metal tubes. The waveguides 70-73 may be ridged or may include flexible material. The disclosed system 64 may be utilized to control and/or monitor any component function or characteristic of a turbomachine, aircraft component operation, and/or other machines.

Prior control and diagnostic system architectures utilized in various applications include a centralized system architecture in which the processing functions reside in an electronic control module. Actuator and sensor communications were accomplished through analog wiring for power, command, position feedback, sensor excitation and sensor signals. Cables and connections include shielding to minimize effects caused by electromagnetic interference (EMI). The use of analog wiring and the required connections can limit application and capability of such systems due to the ability to locate wires, connectors and electronics in harsh environments that experience extremes in temperature, pressure, and/or vibration. Exemplary embodiments can use electromagnetic radiation having radio frequencies transmitted through waveguides 70-73 in a wireless architecture to provide both electromagnetic communication signals and power to the individual elements of the network 65.

The use of electromagnetic radiation in the form of radio waves (MHz to GHz) to communicate and power the sensors and actuators using a traditionally complex wired system provides substantial architectural simplification, especially as it pertains to size, weight, and power (SWaP). Embodiments of the invention provide extension of a network where reduced SNR may compromise network performance by trading off data rates for an expansion of the number of nodes and distribution lines; thereby providing for more nodes/sensors, with greater interconnectivity.

Figure 2:
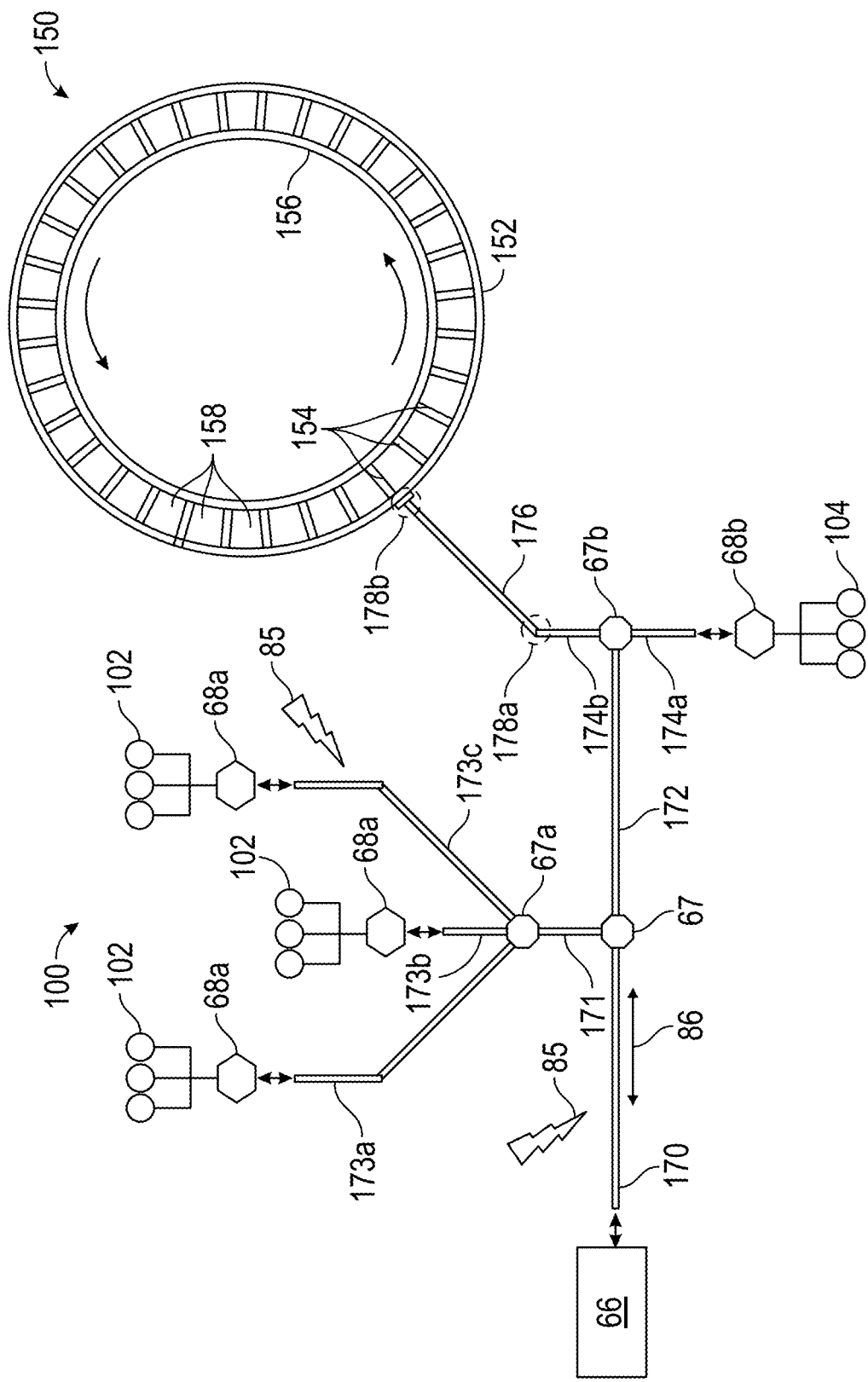
FIG. 2 is a schematic view of a waveguide electromagnetic transmission network including a multi-mode microwave waveguide blade sensing system according to a non-limiting embodiment of the disclosure.

Referring to FIG. 2, a waveguide electromagnetic transmission network 100 is depicted as an example expansion of the network 65 of FIG. 1. The waveguide electromagnetic transmission network 100 can include the controller 66 coupled to coupler 67 through waveguide 170. The coupler 67 is further coupled to coupler 67a through waveguide 171 and to coupler 67b through waveguide 172. Coupler 67a is further coupled to three nodes 68a through waveguides 173a, 173b, 173c in parallel. The nodes 68a can respectively interface or be combined with multiple actuators 102.

Coupler 67b is coupled to waveguides 174a and 174b in parallel. Waveguide 174a establishes signal communication with node 68b, which can interface or be combined with multiple sensors 104. Waveguide 174b includes a portion referred to herein as a probe sensor 176, which is configured to perform blade measurements of a gas turbine engine 150. A first end of the waveguide 174 is coupled to the coupler 67b so as to establish signal communication with the controller 66. The probe sensor 176 includes a proximate probe end 178a and a distal probe end 178b. The proximate probe end 178a is coupled to the second end of the waveguide 174a, thereby establishing signal communication between the controller 66 and the probe sensor 176. The distal probe end 178b is arranged adjacent, or in some cases coupled, to an engine case 152 of the gas turbine engine 150.

The engine case 152 houses a plurality of blades 154 (also referred to as airfoils) formed on a rotor 156. The blades 154 are arranged circumferentially on the rotor 156 and are spaced apart from one another to define voids 158 therebetween. The engine case 152 can include an opening that exposes the internal area of the engine case to the distal end 178b of the probe sensor 176. As the rotor 152 rotates, the blades 154 pass by the opening in the engine case 152, thereby allowing the probe sensor 176 to perform blade measurements as described in greater detail below.

Nodes 68a, 68b can be associated with particular engine components, actuators or any other machine part from which information and communication is performed for monitoring and/or control purposes. The nodes 68a, 68b may contain a single or multiple electronic circuits or sensors configured to communicate over the waveguide electromagnetic transmission network 100. Although the example of FIG. 2 depicts connections to actuators 102 and sensors 104 isolated to different branches, it will be understood that actuators 102 and sensors 104 can be interspersed with each other and need not be isolated on dedicated branches of the waveguide electromagnetic transmission network 100. Couplers 67, 67a, 67b can be splitters and/or can incorporate instances of the radio frequency-based repeater 76 of FIG. 1. Further, one or more instances of the radio frequency-based repeater 76 can be installed at any of the waveguides 170, 171, 172, 173a-c, and/or 174a-b depending on the signal requirements of the waveguide electromagnetic transmission network 100.

The controller 66 can send and receive power and data to and from the nodes 68a, 68b. The controller 66 may be located on equipment near other system components or located remotely as desired to meet application requirements. The controller 66 can be constructed as an electronic hardware controller that includes memory and a processor configured to execute algorithms and computer-readable program instructions stored in the memory. In one or more non-limiting embodiments, the controller 66 is a full authority digital engine controller (FADEC) configured to control and monitor one or more processes of the machine. Accordingly, the controller 66 can determine a rotational speed and/or position of the rotor, and therefore can calculate a rotational speed and/or rotational position of a blade 154 in relation to the location of the probe sensor 176. The controller 66 is also configured to perform signal generation, one or more signal processing operations and/or data analysis operation.

In one or more non-limiting embodiments, the controller 66 generates an electromagnetic microwave energy signal, which is output to the waveguide network 100. In one or more non-limiting embodiments, the microwave energy signal includes a continuous series of individual multiple radio frequency (RF) pluses. In other non-limiting embodiments, the microwave energy signal includes an RF continuous wave (CW). The RF pulses or CW can have a frequency, for example, of about 30 gigahertz (GHz). It should be appreciated, however, that RF pulses having different frequencies can be utilized without departing from the scope of the invention. In either embodiment, the controller 66 can vary the frequency, energy level, shape and/or phase of the output RF pulses and/or CW, thereby invoking different waveguide modes of a microwave energy signal as described in greater detail below. Going forward, the microwave energy signal will be described in terms of RF pulses. However, it should be appreciated that the inventive teachings described herein can be applied to a CW without departing from the scope of the invention.

A transmission path (TP) between the controller 66 and nodes 68a, 68b can be used to send and receive data routed through the controller 66 from a control module or other components. The TP may utilize electrical wire, optic fiber, waveguide or any other electromagnetic communication including radio frequency/microwave electromagnetic energy, visible or non-visible light. The interface between the controller 66 and nodes 68a, 68b can transmit power and signals.

In one or more embodiments, RF pulses output by the controller 66 can be guided via the waveguides (e.g., 170, 172, and 174b) to the probe sensor 176, which directs them into the engine case 152 via the opening and toward the blades 154. RF energy reflected by a given blade 154 is detected by the probe sensor 176, which in turn generates an output signal indicative of a corresponding reflection magnitude. The output signals can be guided back to the controller 66 via the waveguides (e.g., 170, 172, and 174b) such that controller 66 can generate a blade signature of a given blade 154 based on its corresponding reflection magnitude.

The example nodes 68a, 68b can include processing circuitry, controllers, memory and/or the interfaces to connect to conventional sensors or actuators, such as solenoids or electro-hydraulic servo valves. The waveguides 170, 171, 172, 173a-c, and/or 174a-b can be shielded paths that support electromagnetic communication, including, for instance, radio frequency, microwaves, magnetic or optic waveguide transmission. Shielding can be provided such that electromagnetic energy or light interference 85 with electromagnetic signals 86 (shown schematically as arrows) are mitigated in the waveguide electromagnetic transmission network 100. Moreover, the shielding provides that the electromagnetic signals 86 are less likely to propagate into the environment outside the waveguide electromagnetic transmission network 100 and provide unauthorized access to information. In some embodiments, confined electromagnetic radiation is in the range 1-100 GHz. Electromagnetic radiation can be more tightly controlled around specific carrier frequencies, such as 3-4.5 GHz, 24 GHz, 60 GHz, or 76-77 GHz as examples in the microwave spectrum. A carrier frequency can transmit electric power, as well as communicate information, to multiple nodes 68a, 68b using various modulation and signaling techniques.

The nodes 68a with actuators 102 may include control devices, such as a solenoid, switch or other physical actuation devices. RF, electromagnetic or optical devices implemented as node 68b, along with sensors 104 can provide information indicative of a physical parameter, such as pressure, temperature, speed, proximity, vibration, identification, and/or other parameters used for identifying, monitoring or controlling component operation. Signals communicated in the waveguide electromagnetic transmission network 100 may employ techniques such as checksums, hash algorithms, error control algorithms and/or encryption to mitigate cyber security threats and interference.

The waveguide electromagnetic transmission network 100 may be installed in a mixed temperature environment, such as a machine having a hotter portion and a cooler portion. In reference to the example of FIG. 1, the fan section 22 and compressor section 26 of the gas turbine engine 20 can be designated as cooler portions relative to hotter portions of the gas turbine engine 20, such as the combustor section 26 and turbine section 28. To further accommodate the temperature variations within the gas turbine engine 20, a variety of approaches can be used. As one example, electronics devices within the nodes 68a, 68b, actuators 102, and/or sensors 104 can include wide band gap semiconductor devices, such as silicon carbide or gallium nitride devices supporting higher operating temperatures than typical semiconductor devices. Further, the controller 66 operable to communicate with the network of nodes 68a, 68b through the two or more radio frequencies using a higher frequency to communicate with one or more of the nodes 68a, 68b in the cooler portion of the machine and a lower frequency to communicate with one or more of the nodes 68a, 68b in the hotter portion of the machine. As an example, communication between the controller 66 and nodes 68a, 68b at the fan section 22 or compressor section 26 of the gas turbine engine 20 may use radio frequencies at or above 1 GHz, while communication to nodes 68a, 68b at the combustor section 26 or turbine section 28 may use frequencies at or below 1 GHz. The radio frequency threshold selected can depend on resultant heating effects that can occur at higher frequencies. Placement of the nodes 68a, 68b can also impact performance capabilities in the hotter portion of the machine. Where actuators 102 or sensors 104 are needed at locations that would potentially exceed the desired operating temperature of the nodes 68a, 68b that directly interface with the actuators 102 or sensors 104, relatively short wired connections, referred to as "pigtails" can be used between the nodes 68a, 68b and the actuators 102 or sensors 104. The pigtail wiring can provide thermal separation and may support the use of legacy wired actuators 102 and sensors 104 to connect with nodes 68a, 68b. Further temperature accommodations may include cooling systems, heat sinks, and the like.

In some embodiments, shielding in the waveguide electromagnetic transmission network 100 can be provided such that power and communication signals are shielded from outside interference, which may be caused by environmental electromagnetic or optic interference. Moreover, the shielding reduces or prevents intentional interference 85 with communication at the components. Intentional interference 85 may take the form of unauthorized data capture, data insertion, general disruption and/or any other action that degrades system communication. Environmental sources of interference 85 may originate from noise generated from proximate electrical systems in other components or machinery along with electrostatic and magnetic fields, and/or any broadcast signals from transmitters or receivers. Additionally, pure environmental phenomena, such as cosmic radio frequency radiation, lightning or other atmospheric effects, could interfere with local electromagnetic communications.

It should be appreciated that while the system 64 is explained by way of example with regard to a gas turbine engine 20, other machines and machine designs can be modified to incorporate built-in shielding for monitored or controlled components to use of a waveguide electromagnetic transmission network. For example, the system 64 can be incorporated in a variety of harsh environment machines, such as manufacturing and processing equipment, a vehicle system, an environmental control system, and all the like. As a further example, the system 64 can be incorporated in an aerospace system, such as an aircraft, rotorcraft, spacecraft, satellite, or the like. The disclosed system 64 includes the network 65, 100 that provides consistent communication with electromagnetic devices, such as the example nodes 68a, 68b, and removes variables encountered with electromagnetic communications such as distance between transmitters and receiving devices, physical geometry in the field of transmission, control over transmission media such as air or fluids, control over air or fluid contamination through the use of filtering or isolation and knowledge of temperature and pressure.

The system 64 provides for a reduction in cable and interconnecting systems to reduce cost and increases reliability by reducing the number of physical interconnections. Reductions in cable and connecting systems further provides for a reduction in weight while enabling additional redundancy. Moreover, additional sensors can be added without the need for additional wiring and physical connections to the controller 66, which may provide for increased system accuracy and response. Embodiments can provide a "plug-n-play" approach to add a new node, potentially without a requalification of the entire system but only the new component; thereby greatly reducing qualification burdens.

Figure 3A:
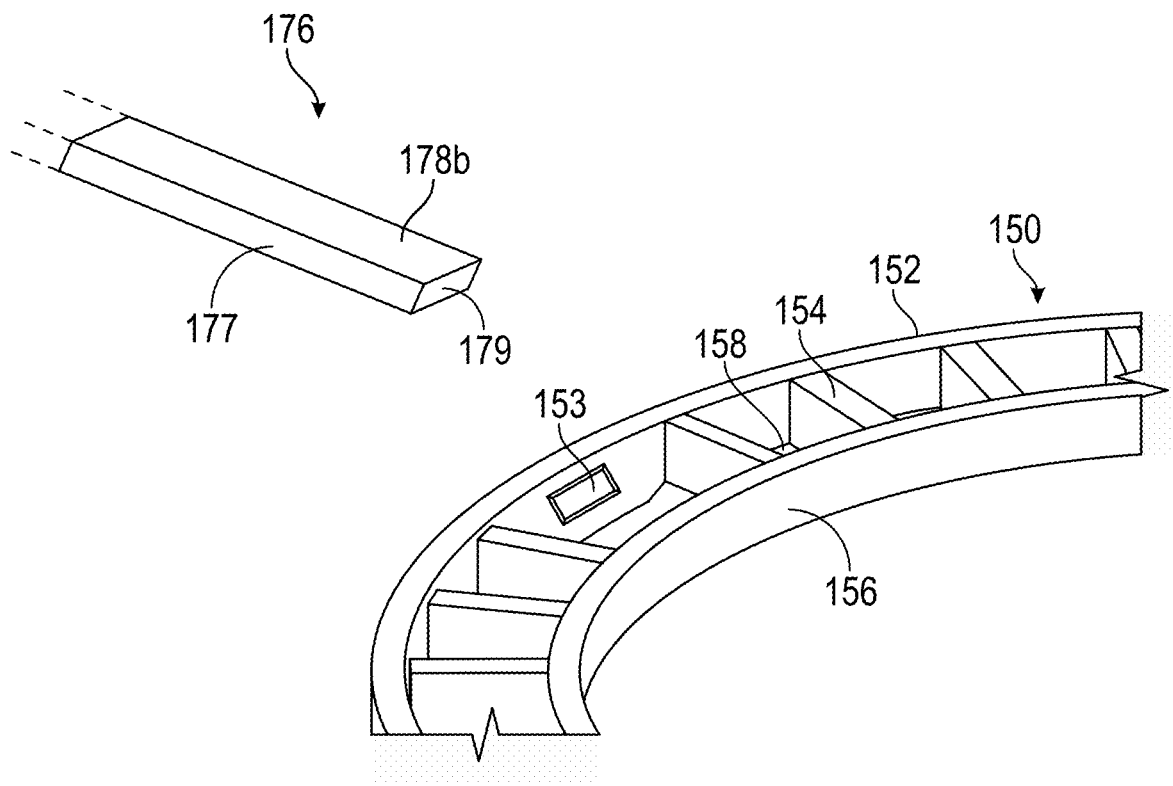
FIG. 3A depicts a single-channel probe sensor included in the multi-mode microwave waveguide blade sensing system shown in FIG. 2 according to a non-limiting embodiment of the disclosure.
Figure 3B:
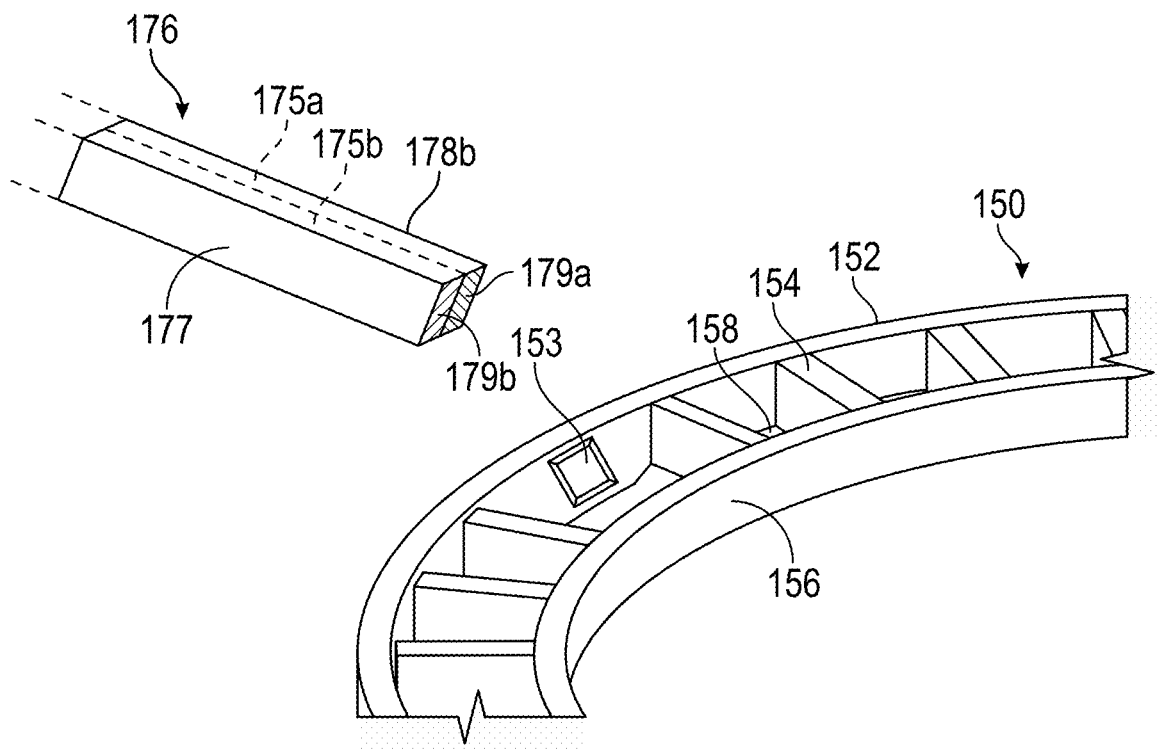
FIG. 3B depicts a multi-channel probe sensor included in the multi-mode microwave waveguide blade sensing system shown in FIG. 2 according to another non-limiting embodiment of the disclosure.
Figure 4:
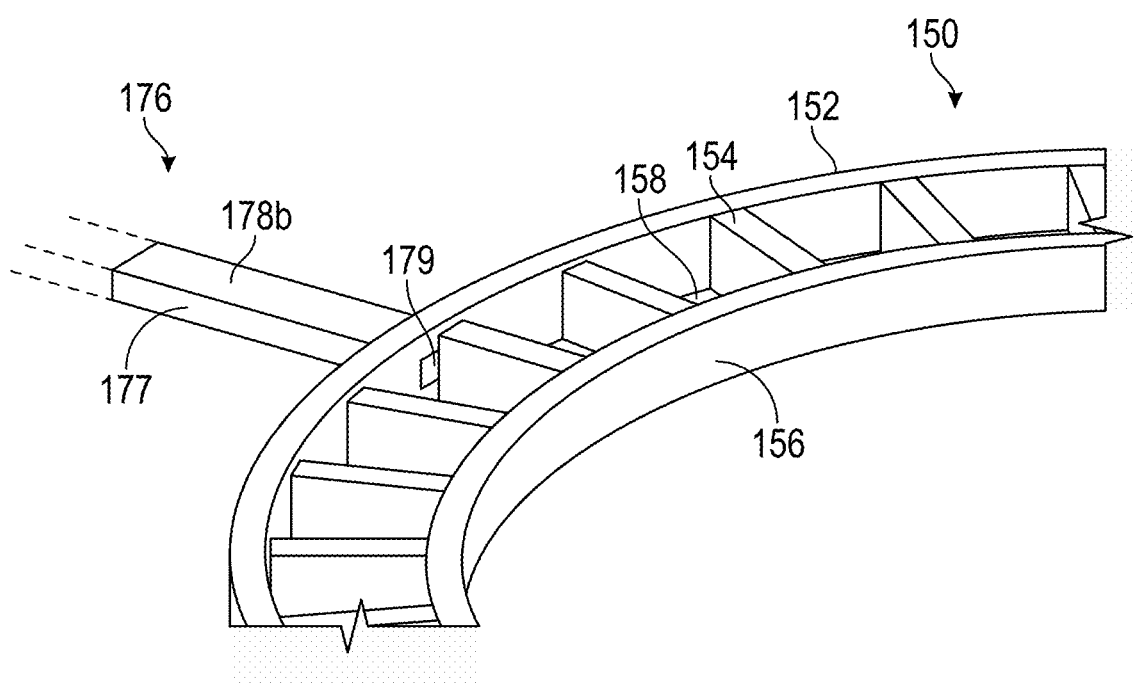
FIG. 4 depicts a probe sensor coupled to a gas turbine engine according to a non-limiting embodiment of the disclosure.

With reference now to FIGS. 3A, 3B and 4, a probe sensor 176 configured to perform blade measurements of a gas turbine engine 150 is illustrated according to non-limiting embodiments of the disclosure. Turning first to FIG. 3A, the probe sensor includes a hollow probe body 177 having a proximate end 178a (see FIG. 2) and a distal end 178b. The probe body 177 extends from the proximate end 178a to the distal end 178b to define a probe channel. As described above, the proximate end 178a is configured to establish signal communication with a waveguide (e.g., waveguide 174b included in the waveguide electromagnetic transmission network 100 (see FIG. 2). In one or more embodiments, the proximate end 178a can be in signal communication with a microwave transceiver (not shown) that provides an RF signal source independently from the controller 66.

The distal end 178b includes an aperture and is configured to mate with an opening 153 formed in the engine case 152 (see FIG. 4). For example, the distal end 178 can extend into the opening 153 so as to deliver a series of RF signal pulses having an energy level, a shape and a phase into the engine case 152. The probe sensor 176 further includes a lens 179 disposed in the probe channel of the distal end 178 to focus the RF pulses into the engine case 152. The lens 179 can also adjust the field of view (FOV) of the probe aperture to increase detectability of the turbine blades 154 contained in the engine case 152. Although the probe sensor 176 is shown as having a single lens 179 corresponding to a single probe channel, the present inventive teachings are not limited thereto.

Turning to FIG. 3B, for example, the probe sensor 176 is shown as having a plurality of probe channels 175a and 175b. The probe channels 175a and 175b extend from the proximate end 178a to the distal end 178b. Accordingly, the probe channel 175a and 175b can respectively deliver an independent series of RF pulses to the opening 153 formed in the engine case 152. Although two probe channels 175a and 175b are shown in FIG. 3B, it should be appreciated that the probe sensor 176 can include additional probe channels without departing from the scope of the invention.

Although the probe channels 175a and 175b are shown being arranged horizontally, one next to the other the arrangement of the probe channels 175a and 175b is not limited thereto. In other non-limiting embodiments, for example, the plurality of probe channels 175a and 175b can be a stacked vertically atop one another. In yet other non-limiting embodiments, the probe sensor 176 can include a first probe channel and a second probe channel disposed against the first channel, where the second channel is partitioned to define a plurality of sub-channels. Accordingly, a sub-channel can be configured to deliver an individual series of RF pulses.

With continued reference to FIG. 3B, the probe sensor 176 further includes a plurality of lenses 179a and 179b. The lenses 179a and 179b are disposed in or at a respective probe channel 175a and 175b of the distal end 178b. The lenses 179a and 179b are configured to focus the RF pulses traveling through the respective probe channels 175a and 175b into the opening 153 of the engine case 152. In one or more embodiments, each lens 179a and 179b can have a different lens index with respect to one another to focus the RF pulses to target locations of the turbine blades 154. The lenses 179a and 179b are also configured to refine the field of view (FOV) of the probe aperture, thereby improving the precision at which the turbine blades 154 are detected.

In one or more non-limiting embodiments, a first probe channel (e.g., probe channel 175a) among the plurality of probe channels can deliver a first series of RF pulses having a first energy level, first shape and first phase to the first lens 179a, while a second channel (e.g., 175b) among the plurality of probe channels delivers a second series of RF pulses having a different second energy level, different second shape and/or a different second phase to the second lens 179b. The varying the energy level, shape and/or phase can control the direction at which the RF pulses exit the probe sensor 176. In this manner, the energy level, shape and/or phase can be varied so as to focus the RF pulses toward the tip of a given blade 154 or toward the leading and trailing edges of given blade 154. In one or more non-limiting embodiments, the first and second series of RF pulses can be delivered simultaneously with respect to one another regardless as to rotational position of the blades 154. In other non-limiting embodiments, the first and second RF pulses can be delivered at different times with respect to one another.

In such an embodiment, the timing at which the first and second RF pulses are generated and output can be based on a rotational position of the blades 154. For example, the first series of RF pulses can be generated when a tip of a given blade 154 is expected centered with respect to the FOV of the probe sensor 176. The second series of RF pulses can be generated when a leading edge or trailing edge of a given blade 154 is expected to enter or leave the FOV, respectively. In some embodiments, the probe sensor 176 can be configured to deliver the first and second RF pulses along a single probe channel. In other embodiments, the probe sensor 176 can be configured to deliver the first RF pulses along a first probe channel and deliver the second RF pulses along a second probe channel different from the first probe channel.

Figure 5:
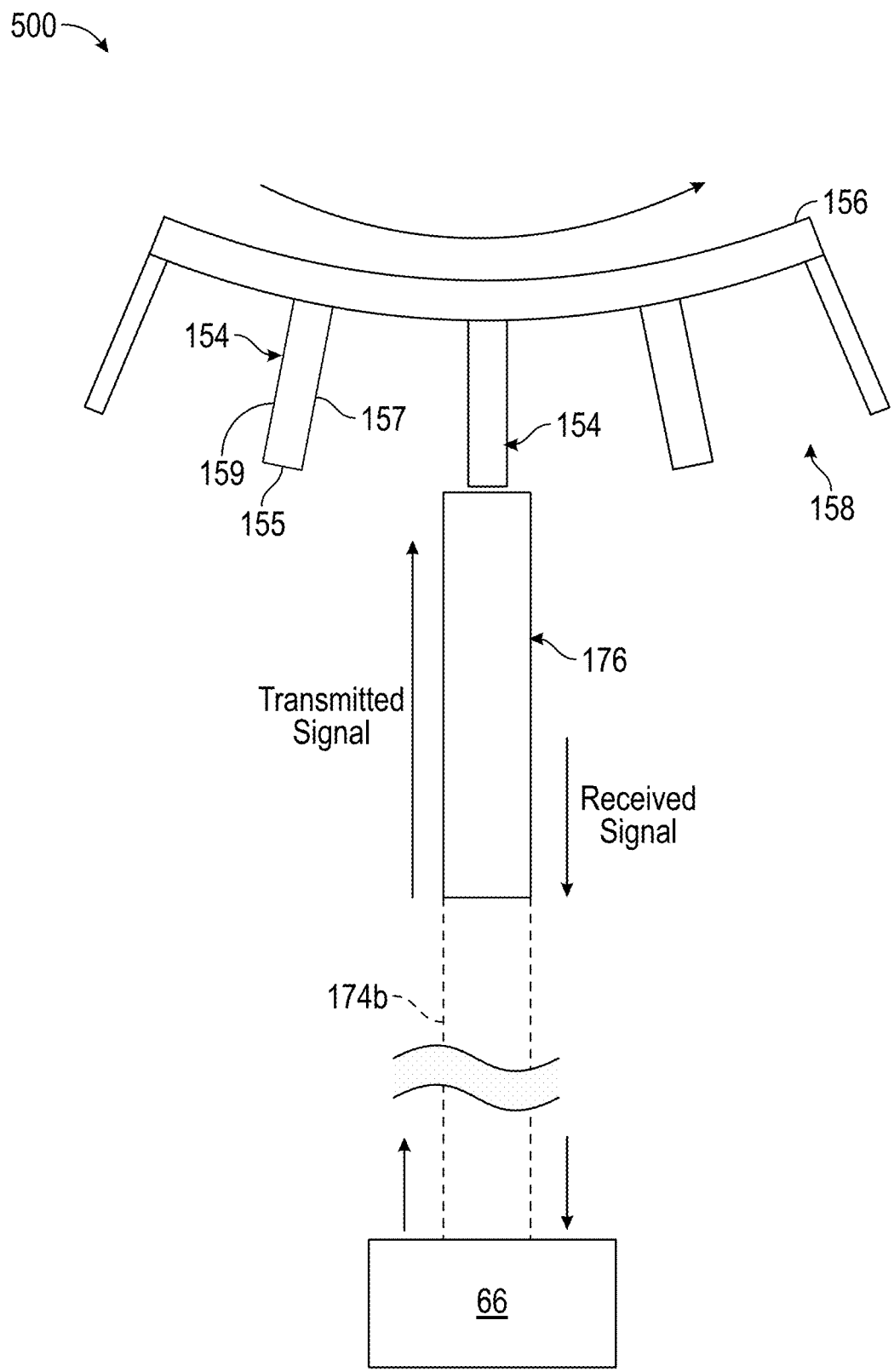
FIG. 5 depicts a multi-mode microwave waveguide blade sensing system according to a non-limiting embodiment of the disclosure.

With reference now to FIG. 5, a multi-mode microwave waveguide blade sensing system 500 is illustrated according to a non-limiting embodiment. The multi-mode microwave waveguide blade sensing system 500 includes a controller 66, a waveguide 174b, and a probe sensor 176. Although a single waveguide 174b is shown, it should be appreciated that additional waveguides can be employed without departing from the scope of the invention.

The controller 66 is configured to output one or more microwave energy signals. As described herein a microwave energy signal can include one or more series of RF pulses or a RF CW, either signal having an energy level, a shape and phase. The RF pulses can have a frequency, for example, of about 30 GHz.

The controller 66 is further configured to determine a rotational position of a gas turbine engine rotor 156 and thus the rotational position of a turbine blade formed on the rotor 156. The rotational position of the blades 154 include the rotational position of a tip of a given blade 154 and one or both of a leading edge 157 and trailing edge 159 of the given blade 154. The rotational speed and/or position of the rotor 156 and blades 154 can be determined by calculation and/or based on an output from a speed sensor and/or blade detection sensor.

The waveguide 174b includes a first end configured to a microwave energy signal from a signal source (e.g., transceiver) and a second end in signal communication with the probe sensor. The probe sensor 176 is configured to direct the microwave energy signal toward the blades 154 and to detect or receive reflected microwave energy signals produced when the directed microwave energy signal is reflected from a passing blade 154. Accordingly, the probe sensor 176 effectively generates an output sensor signal indicating a magnitude of the reflected portion of microwave energy signal reflected by a given passing blade 154. The output sensor signal is passed to the waveguide 174b, which in turn guides it back to the controller 66. Accordingly, the controller 66 can generate a blade signature of a given blade 154 based on the sensor output signal, e.g., the magnitude of the reflected portion of microwave energy signal reflected by a given blade 154 passing in front of the probe sensor 176

As described herein, each mode of the directed microwave energy signal has a different field pattern when they are output from the probe sensor 176 such that the pattern of fields are different on the waveguide cross section. Accordingly, the amount of reflected microwave energy signal received by the sensor by probe is low when the leading edge 157 and trailing edge of the blade 159 enters and exits the FOV of the probe sensor 176. The low reflection can cause the controller 66 to produce inaccurate measurements of the leading edge 157 and trailing edge 159, thereby producing an inaccurate resolution or blade signature of a given blade 154. In one or more non-limiting embodiments, the controller 66 is configured to invoke different waveguide modes that vary the characteristics of generated microwave energy signal (e.g., the generated RF pulses and/or RF CW), which in turn significantly increases the resolution and accuracy of the blade signatures. For instance, a first waveguide mode generates a first microwave energy signal type configured to achieve a high or maximum reflection from the center tip 155 of a given blade 154. A second waveguide mode generates a second microwave energy signal type configured to achieve maximum reflection from the leading edge and trailing edge of a given blade 154 Accordingly, the probe sensor 176 can receive high or maximum reflected microwave energy from the entire blade 154, thereby improving the resolution and blade signature generated by the controller 66.

In some non-limiting embodiments, the first and second waveguide modes can be selectively invoked. For instance, the second waveguide mode for generating an initial type of microwave energy signal can be invoked at a time when the leading edge of a given blade 154 enters the FOV of the probe sensor 176. The first waveguide mode can then be sequentially invoked to generate a different type of microwave energy signal at a time when the blade tip of the given blade 154 enters the FOV. The second waveguide mode can then again be sequentially invoked to generate the initial type of microwave energy signal at a time when the trailing edge of the given blade 154 enters the FOV.

In other non-limiting embodiments, the first and second waveguide modes can operate simultaneously such that the two different types waveguide modes are generated at the same time and co-exist in the waveguide. The controller 66 is configured to receive what appears as a single reflected energy signal, but can decompose the reflected energy to identify both independent reflected microwave energy signals corresponding to the two different types of microwave energy signal. Accordingly, the controller 66 can determine the energy levels corresponding to an individual reflected microwave energy signal and generate a blade profile of a given blade based on the individual energy levels.

Figure 6A:
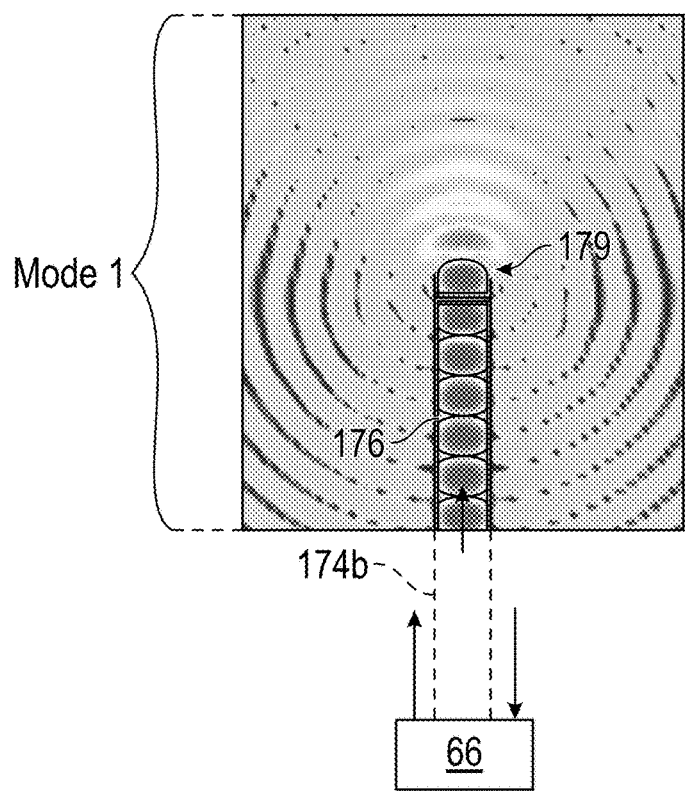
FIG. 6A depicts a probe sensor of included in a multi-mode microwave waveguide blade sensing system generating a signal having a first waveguide mode according to a non-limiting embodiment of the disclosure.
Figure 6B:
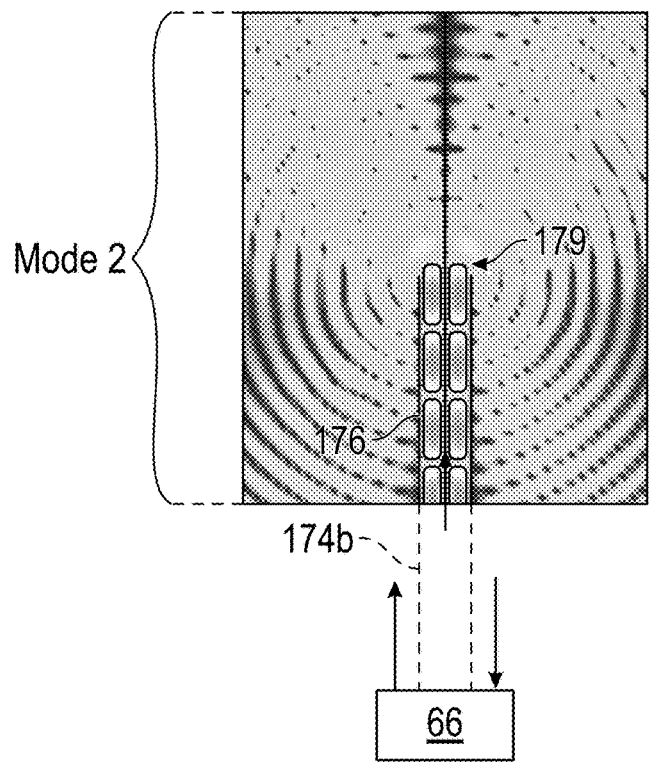
FIG. 6B depicts the probe sensor of FIG. 5 generating a signal having a second waveguide mode according to a non-limiting embodiment of the disclosure.
Figure 7A:
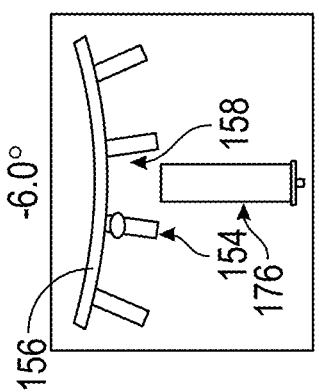
FIGS. 7A-7K depicts a probe sensor performing multi-mode blade measurements of turbine blades at different rotational angles according to a non-limiting embodiment of the disclosure.
Figure 7B:
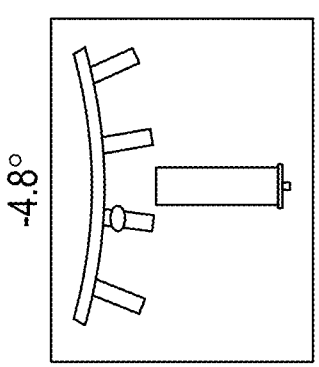
Figure 7C:
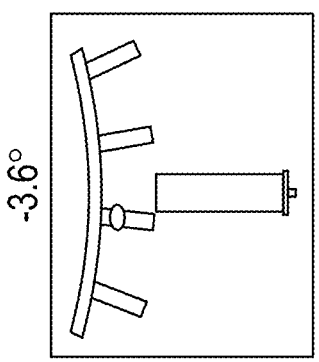
Figure 7D:
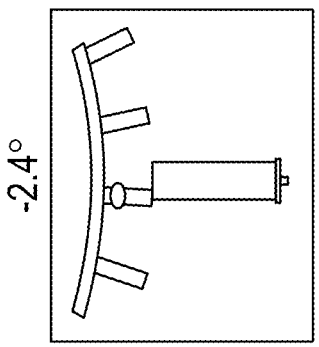
Figure 7E:
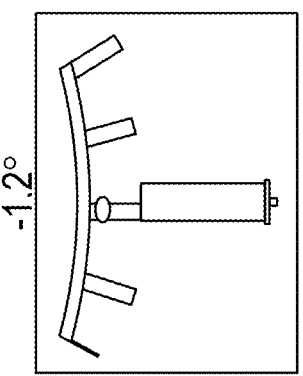
Figure 7F:
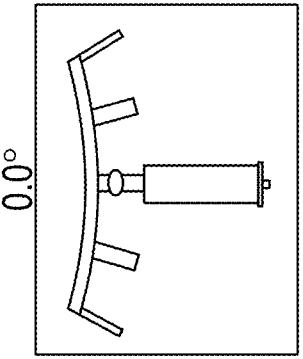
Figure 7G:
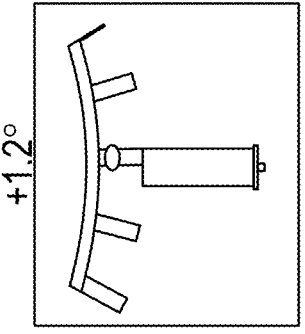
Figure 7H:
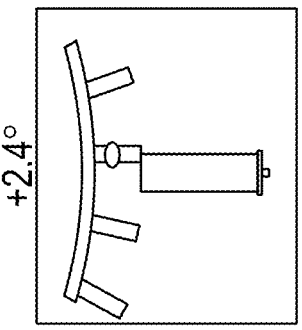
Figure 7I:
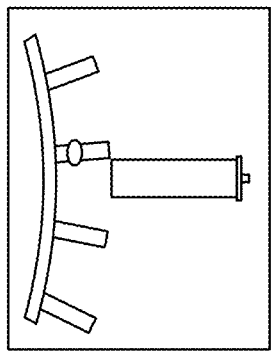
Figure 7J:
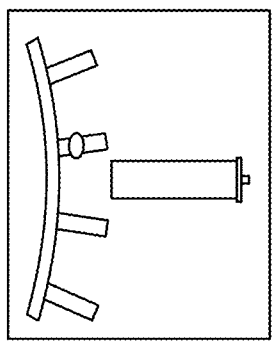
Figure 7K:
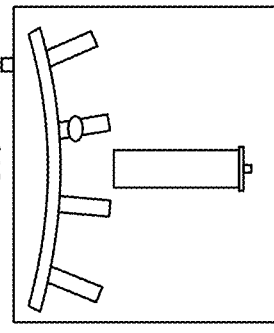

With reference to FIGS. 6A and 6B, the controller 66 is illustrated operating in a plurality of different waveguide modes to generate different types of microwave energy signals. The different types of microwave energy signals can be defined by their respective energy level, shape and/or phase. FIG. 6A, for example, shows the controller 66 generating a microwave energy signal having a first mode, which is and output from the aperture (e.g., lens 179) of the waveguide 174a. The first waveguide mode can define a first microwave energy signal type having an energy level, a shape, and a phase. FIG. 6B shows the controller 66 generating a microwave energy signal having a second mode, which is and output from the aperture (e.g., lens 179) of the waveguide 174a. The second waveguide mode can define a second microwave energy signal type having a different energy level, different shape and different phase.

In one or more non-limiting embodiments, the controller 66 can simultaneously invoke both the first and second waveguide modes (e.g., control a transceiver to generate a microwave signal having the first and second waveguide modes), which in turn simultaneously generates the first and second series of RF pulses. In other non-limiting embodiments, the controller 66 can selectively invoke the first and second waveguide modes at different times based on the based on the rotational position of the blades 154 relative to the location of the probe sensor 176. For example, the timing at which the first RF pulses are output is based on a rotational position of a tip of a given blade 154 in relation to the aperture of the probe sensor 176, while the timing at which the second RF pulses are output is based on the rotational position of one or both of a leading edge and trailing edge of the given blade 154 in in relation to the aperture of the probe sensor 176.

In embodiments where the first and second series of RF pulses are generated at different times, the probe sensor 176 can deliver the different RF pulses along individual respective probe channels. For example, the probe sensor 176 can deliver the first series of RF pulses along a first probe channel and deliver the second series of RF pulses along a second probe channel different from the first probe channel.

In any case, the type of RF pulses generated according to a respective waveguide mode can control the direction at which the RF pulses are output from the probe sensor 176. As shown in FIG. 6A, for example, the first series of RF pulses exit the probe sensor 176 in a first direction (e.g., in a substantially center direction) based on at least one of the first energy level, the first shape and first phase. In this manner, the first RF pulses can be focused toward the tip of a given blade 154. As shown in FIG. 6B, however, the second series of RF pulses are exit the probe sensor 176 in a second different direction (e.g., a laterally) based on at least one of the second energy level, second shape and second phase. In this manner, the second RF pulses can be focused toward the leading edge 157 and trailing edge 159 of a given blade 154.

Figure 8A:
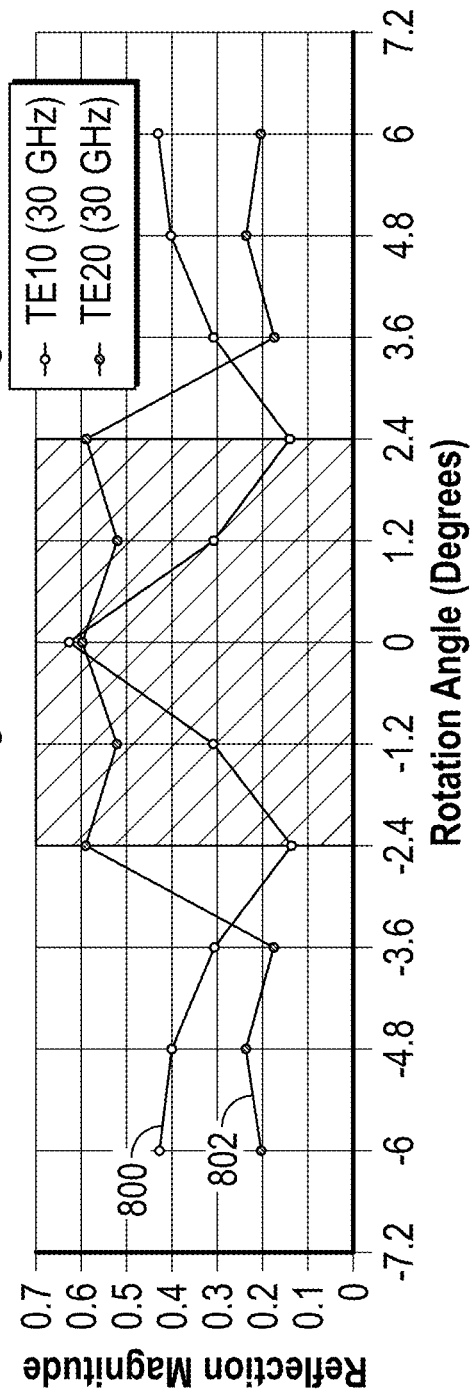
FIG. 8A depicts a graph illustrating a reflection magnitude of a measured blade vs. a rotational angle of a measured turbine blade according to the first waveguide mode according to a non-limiting embodiment of the disclosure.

With reference to FIGS. 7A-7K, a probe sensor 176 is illustrated performing multi-mode blade measurements of a targeted turbine blade 154 at different rotational angles according to a non-limiting embodiment of the disclosure. FIG. 8A depicts a graph illustrating a reflection magnitude vs. a rotational angle of the targeted blade 154 shown in FIGS. 7A-7K measured according to the first waveguide mode, e.g., where a first type of RF pulses are focused toward a center tip 155 of the targeted blade 154. Similarly, FIG. 8B depicts a graph illustrating a reflection magnitude vs. a rotational angle of the targeted blade 154 shown in FIGS. 7A-7K measured according to the second waveguide mode, e.g., where a second type of RF pulses are focused toward the leading edge 157 and trailing edge of the targeted blade 154.

Referring first to FIG. 8A, as the targeted blade moves through the FOV (e.g., −2.4° to +2.4) of the probe sensor 176, the measured microwave energy 800 generated in response to the first waveguide mode and reflected from the blade tip 155 increases as the blade tip 155 moves toward the center of the FOV. However, the measured microwave energy 802 from the energy reflected by the leading edge 157 and trailing edge 159 according to the second waveguide mode decreases as the blade tip 155 moves toward the center of the FOV and the leading and trailing edges exit and enter the FOV, respectively.

Figure 8B:
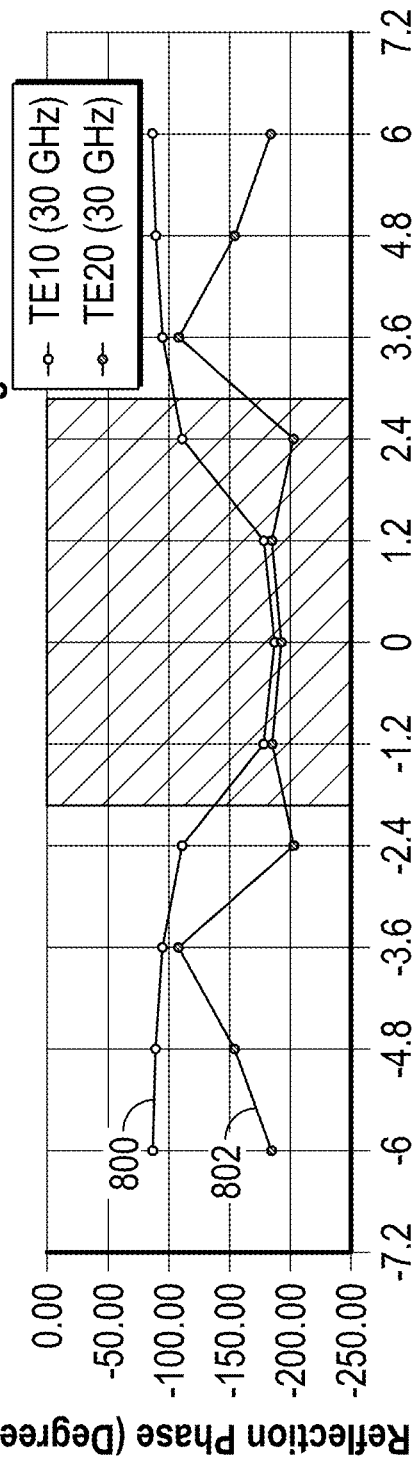
FIG. 8B depicts a graph illustrating a reflection phase of a measured blade vs. a rotational angle of the measured turbine blade according to the second waveguide mode according to a non-limiting embodiment of the disclosure.

Referring to FIG. 8B, however, as the targeted blade moves through the FOV (e.g., −2.4° to +2.4) of the probe sensor 176, the measured microwave energy 800 generated in response to the second waveguide mode and reflected from the leading edge 157 and trailing edge 159 increases as the leading and trailing edges enter an exit the FOV, while the measured microwave energy 802 generated by the blade tip decreases as it moves away from the center of the FOV.

Accordingly, by combining the microwave energy reflection provided by the blade tip 155 obtained according to the first waveguide mode and the microwave energy reflection provided by the leading and trailing edges 157, 159 obtained according to the second waveguide mode, the controller 66 can obtain a maximum amount of reflected microwave energy from a given passing blade 154. In this manner, the controller 66 can generate a blade signature having improved resolution and accuracy.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A multi-mode microwave waveguide blade sensing system, comprising:
   a transceiver configured to generate at least one microwave energy signal having a first waveguide mode and a second waveguide mode different from the first waveguide mode;
   a waveguide including a first end configured to receive the at least one microwave energy signal from the transceiver; and
   a probe sensor including a proximate end in signal communication with a second end of the waveguide to receive the at least one microwave energy signal and a distal end including an aperture configured to output the at least one microwave energy signal,
   a controller configured to monitor rotation of a plurality of blades formed on a rotor of a machine, to determine a rotational position of a given blade among the plurality of blades with respect to the probe sensor, and to control the transceiver to vary characteristics of the at least one microwave energy signal to invoke the first and second waveguide modes,
   wherein the probe sensor directs the microwave energy signal toward a machine including the plurality of blades formed on the rotor at a first direction based on the first waveguide mode and a second direction different from the first direction based on the second waveguide mode, and receives different levels of reflected microwave energy based at least in part on a location at which the at least one microwave energy signal is reflected from the machine, and
   wherein the controller selectively invokes the first and second waveguide modes based on the rotational position of the given blade with respect to a field of view of the probe sensor.

2. The multi-mode microwave waveguide blade sensing system of claim 1, wherein the microwave energy signal includes one or both of series of radio frequency pulses and a continuous wave.

3. The multi-mode microwave waveguide blade sensing system of claim 1, wherein the first and second waveguide modes define characteristics of the at least one microwave energy signal, the characteristics including at least one of an energy level, a shape and phase.

4. The multi-mode microwave waveguide blade sensing system of claim 3, wherein the transceiver is configured to output a first microwave energy signal having a first energy level, shape and first phase, a second microwave energy signal having a second shape and second phase.

5. The multi-mode microwave waveguide sensing system of claim 4, wherein the first microwave energy signal is output from the probe sensor in a first direction based on at least one of the first energy level, the first shape and first phase, and the second microwave energy signal is output from the probe sensor in a second different direction based on at least one of the second energy level, second shape and second phase.

6. The multi-mode microwave waveguide sensing system of claim 5, wherein the transceiver is in signal communication with a controller to set the characteristics of the first and second microwave energy signals based on a rotational position of a tip of a given blade and one or both of a leading edge and trailing edge of a given blade.

7. The multi-mode microwave waveguide sensing system of claim 6, wherein the controller determines a first magnitude of reflected microwave energy based on a reflection of the first microwave energy signal from the tip and determines a second magnitude of reflected microwave energy based on a reflection of the second microwave energy signal from one or both of the leading and trailing edges, and determines a blade signature of the given blade based on a combination of the first magnitude of the reflected microwave energy and the second magnitude of the reflected microwave energy.

8. The multi-mode microwave waveguide sensing system of claim 4, wherein the waveguide and the probe sensor are configured to simultaneously deliver the first microwave energy signal and the second microwave energy signal.

9. The multi-mode microwave waveguide sensing system of claim 8, wherein the probe sensor receives a first reflected microwave energy signal corresponding to the first microwave energy signal and second reflected microwave energy signal corresponding to the second microwave energy signal, and delivers the first and second reflected microwave signals to the waveguide.

10. The multi-mode microwave waveguide sensing system of claim 9, wherein the first and second reflected microwave energy signal co-exist together in the waveguide.

11. The multi-mode microwave waveguide sensing system of claim 10, wherein the controller determines a first level of reflected microwave energy corresponding to the first reflected microwave energy signal and a second level of reflected microwave energy corresponding to the second reflected microwave energy signal, and generates a blade profile of a given blade included in the machine based on the first and second levels of reflected microwave energy.

* * * * *